United States Patent
Chiu et al.

(10) Patent No.: US 8,485,479 B2
(45) Date of Patent: Jul. 16, 2013

(54) CABLE MANAGEMENT APPARATUS

(75) Inventors: Po-Wen Chiu, New Taipei (TW); Wen-Hu Lu, Shenzhen (CN); Zhan-Yang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 110 days.

(21) Appl. No.: 13/176,324

(22) Filed: Jul. 5, 2011

(65) Prior Publication Data
US 2012/0145838 A1 Jun. 14, 2012

(30) Foreign Application Priority Data
Dec. 13, 2010 (CN) .......................... 2010 1 0584958

(51) Int. Cl.
*F16L 3/00* (2006.01)
(52) U.S. Cl.
USPC ........................... 248/73; 248/68.1; 248/74.2

(58) Field of Classification Search
CPC ............ F16L 3/222; F16L 3/233; F16L 3/127; F16L 3/12; F16L 3/13
USPC ............... 248/74.2, 65, 68.1, 71, 72, 73, 74.5
See application file for complete search history.

(56) References Cited

U.S. PATENT DOCUMENTS

| | | | | |
|---|---|---|---|---|
| 4,325,526 A | * | 4/1982 | Kitagawa | 248/73 |
| 6,164,603 A | * | 12/2000 | Kawai | 248/73 |
| 7,304,861 B2 | * | 12/2007 | Takahashi | 361/760 |
| 8,215,595 B2 | * | 7/2012 | Li | 248/74.2 |
| 2009/0294600 A1 | * | 12/2009 | Dodge | 248/73 |
| 2012/0145837 A1 | * | 6/2012 | Li | 248/74.2 |
| 2012/0228001 A1 | * | 9/2012 | Li | 174/135 |

* cited by examiner

*Primary Examiner* — Anita M King
(74) *Attorney, Agent, or Firm* — Altis Law Group, Inc.

(57) ABSTRACT

A cable management apparatus includes a securing board and a cable management clip. A clipping portion and a securing portion are located on the securing board. The cable management clip includes a mounting base and a pressing clip pivotally attached to the mounting base. A cable may be locked between the mounting base and the pressing clip. Elastic arms extend from the mounting base, the elastic arms deform to allow the fitment and removal of the cable management clip from the securing board.

20 Claims, 4 Drawing Sheets

CABLE MANAGEMENT APPARATUS

BACKGROUND

1. Technical Field

The present disclosure relates to cable management apparatuses, and more particularly to a cable management apparatus used in an electronic device.

2. Description of Related Art

Many electronic devices, such as computers, need a plurality of cables. The cables may be, for example, include power cables, data cables, communication lines, keyboard lines, and so on. It is therefore desirable to include some type of cable management apparatus, such as a binding accessory, that allows the various cables to be collected together and attached in a position to improve the use of space and the ease of visual examination inside an electronic device. However, the conventional binding accessory is not suited for temporary use in securing cables, and it is often difficult to replace or re-route the cables.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
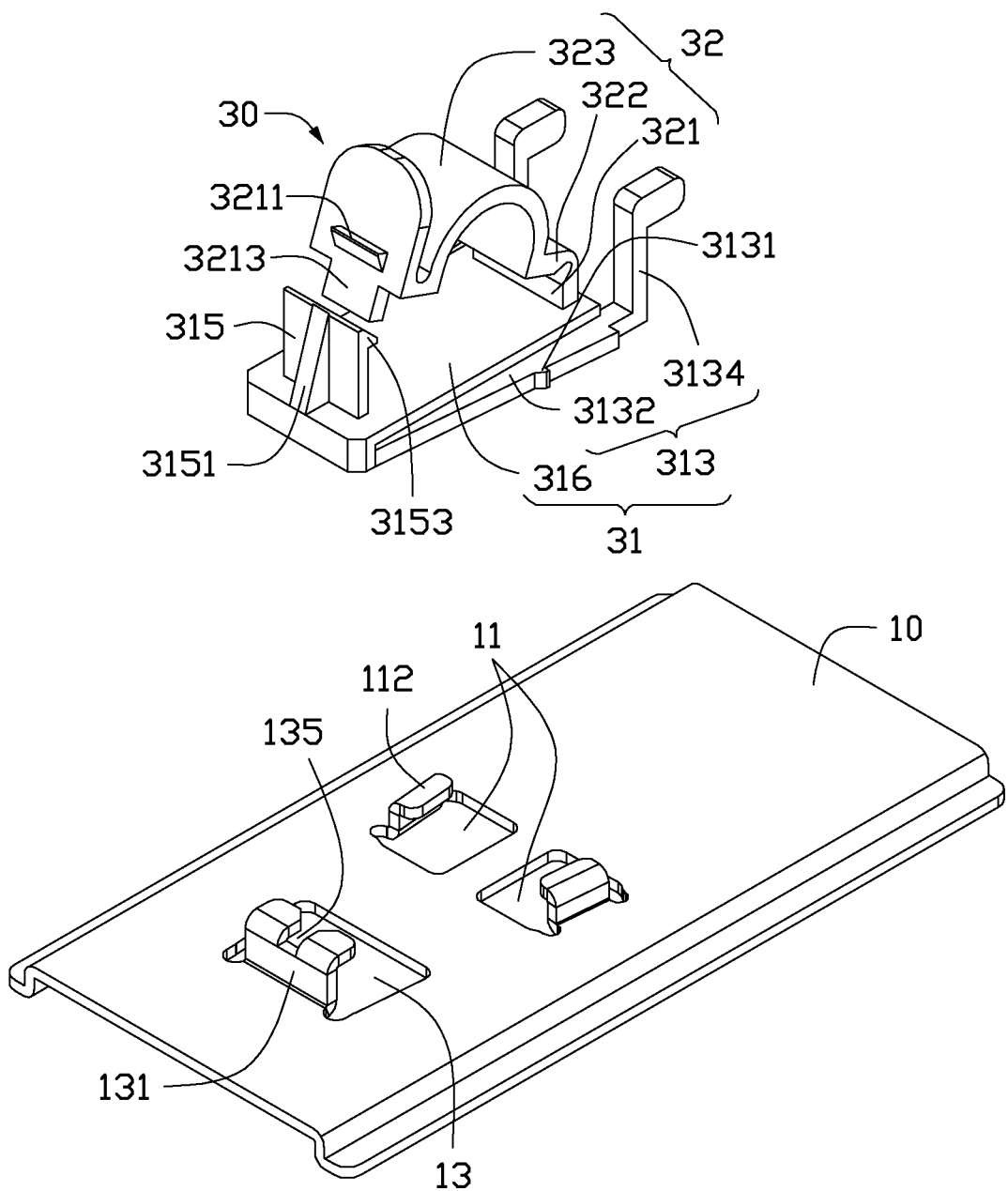
FIG. 1 is an isometric, exploded view of an exemplary embodiment of a cable management apparatus.
Figure 2:
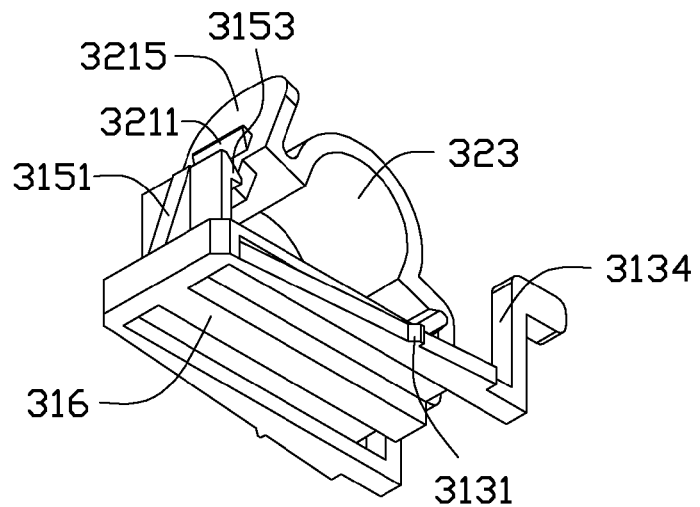
FIG. 2 is similar to FIG. 1, but viewed from another aspect.
Figure 2:
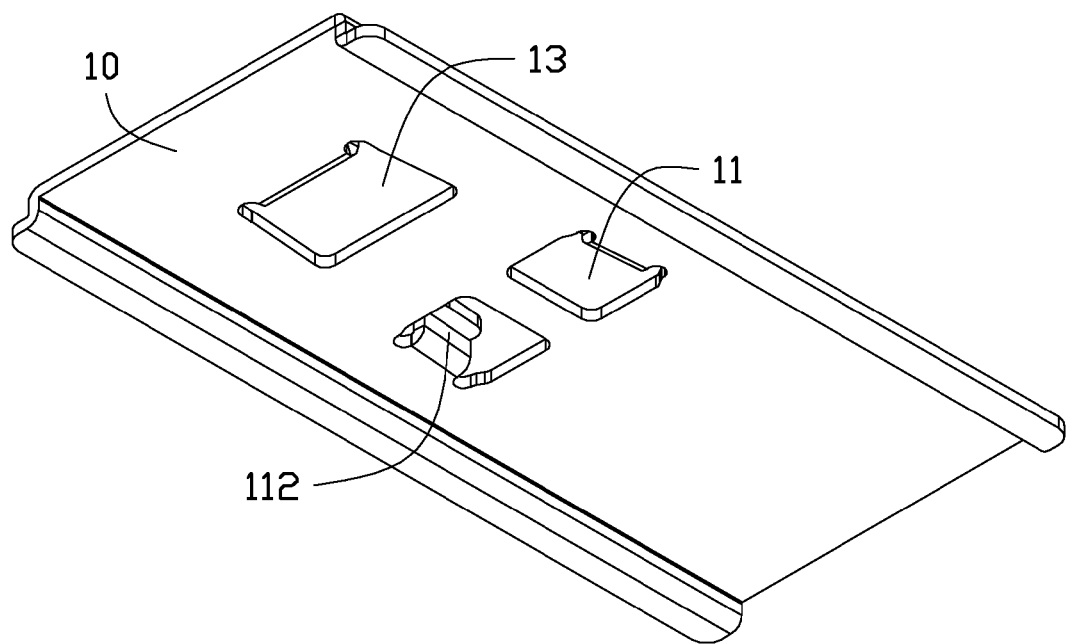
Figure 3:
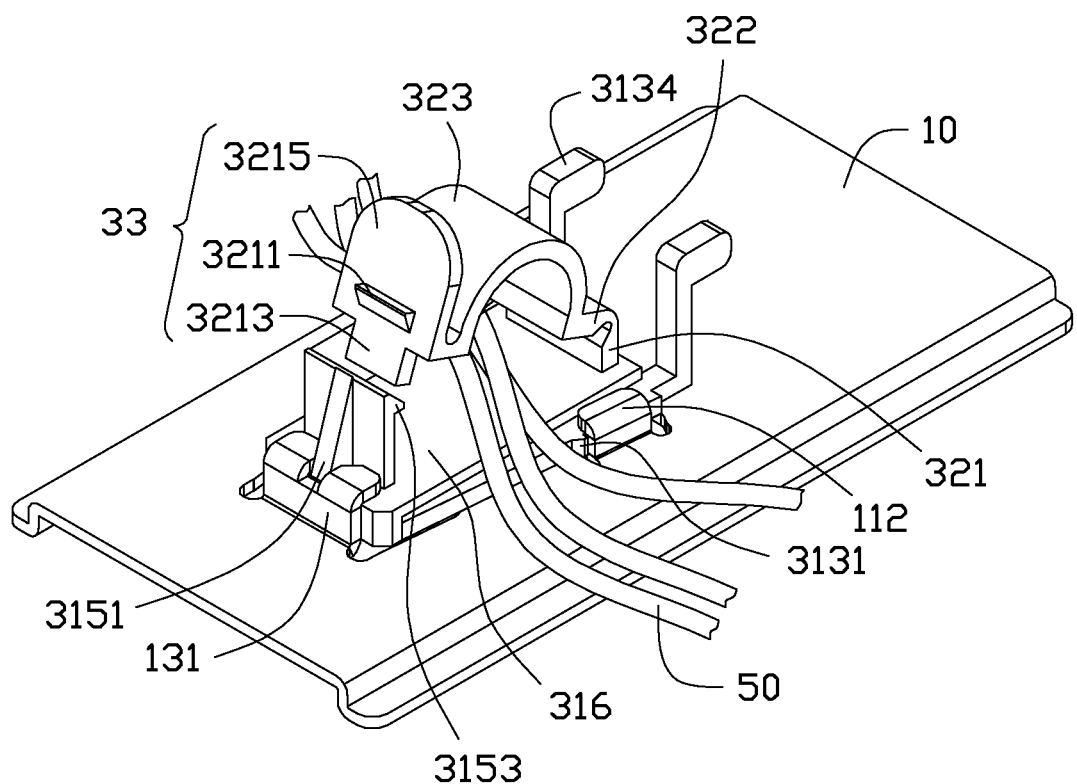
FIG. 3 is an assembled view of FIG. 1, and a pressing clip of the cable management apparatus unlocked from a mounting base of the cable management apparatus.
Figure 4:
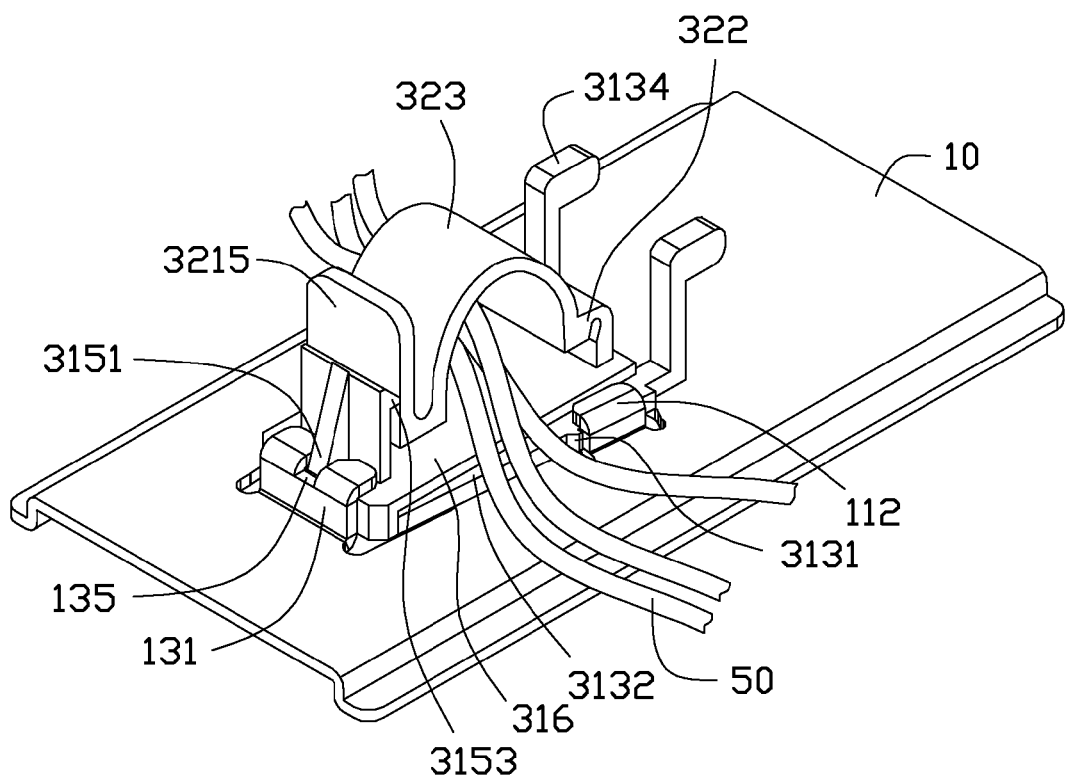
FIG. 4 is similar to FIG. 3, but the pressing clip is locked to the mounting base.

Referring to FIGS. 1 and 2, a cable management apparatus in accordance with an exemplary embodiment includes a securing board 10 and a cable management clip 30 mounted to the securing board 10. In one exemplary embodiment, the cable management clip 30 receives a cable 50 (see FIG. 3).

An opening 13 and a pair of through holes 11 (as a consistent group of objects in case of plurality) are defined in the securing board 10. Each through hole 11 has a clipping portion 112 located on the edge furthest from the companion securing hole 11. A securing portion 131 is located on the edge of the opening 13 spaced furthest from the pair of through holes 11. A cutout 135 in the securing portion 131 creates a medial vertical slot in the securing portion 131. In one exemplary embodiment, the opening 13 and the pair of through holes 11 are arranged as the three corners of a triangle. In one exemplary embodiment, the securing board 10 is substantially square in shape.

The cable management clip 30 includes a mounting base 31 and a pressing clip 32 integral with the mounting base 31. The mounting base 31 includes a main body 316 and two elastic arms 313 located on opposite sides of the main body 313, the arms 313 diverge longitudinally from the main body 316 when in an uncompressed state. A retaining portion 315 is located on a top surface of the main body 316 and has a supporting rib 3151 and a hook 3153 located thereon. The cutout 135 can accommodate the supporting rib 3151.

Each elastic arm 313 includes a mounting portion 3132 and an operating portion 3134 connected to the mounting portion 3132. The mounting portion 3132 extends from the main body 316 and has a block 3131. In one exemplary embodiment, the operating portion 3134 is L-shaped, and substantially perpendicular to the mounting portion 3132 and is located outside of the main body 316.

The pressing clip 32 includes a connecting portion 321, a pressing portion 323, and a flexible pivoting portion 322 located between the connecting portion 321 and the pressing portion 323. The connection portion 321 is connected to the main body 316. The flexible pivoting portion 322 acts as a hinge connecting the connection portion 329 and the pressing portion 323. The distal end of the pressing portion 323 is an engaging portion 33 which can be secured by the hook 3153 of the main body 316. In one exemplary embodiment, the engaging portion 33 can include a handle 3215, an extending piece 3213 extending down from the handle 3125, and a ledge or clasp (clasp 3211) protruding horizontally forwards from the middle of the handle 3215. The engaging portion 33 is engaged by the hook 3153 acting on the clasp 3211.

Referring to FIGS. 1 to 4, in use, the securing board 10 is secured to a position on or within an electronic device. The main body 316 of the cable management clip 30 is placed in an appropriate location on the securing board 10. The two elastic arms 313 abut the pair of clipping portions 112, and the retaining portion 315 of the main body 316 is adjacent to the securing portion 131 of the securing board 10.

The operating portion 3134 of each elastic arm 313 is operated to deform each elastic arm 313 in a first direction substantially parallel to the main body 316 for clearance through each clipping portion 112. When each elastic arm 313 is clear of each clipping portion 112, the cable management clip 30 is pushed in a second direction substantially perpendicular to the first direction and towards to the securing portion 131, until the securing portion 131 is engaged with the main body 316 and the supporting rib 3151 is received in the cutout 135. The two elastic arms 313 are released by the user, and the block 3131 abuts the front edge of the clipping portion 112 to prevent the cable management clip 30 moving backwards.

The cable 50 is placed between the pressing portion 323 and the main body 316. The pressing clip 32 is pushed down to the main body 316 until the clasp 3211 is engaged by the hook 3153. Therefore, the cable 50 is kept in place between the pressing portion 323 and the main body 316. The extending piece 3213 separates the cable 50 from the clasp 3211 and the hook 3153 to prevent damage to the cable 50.

When the cable 50 needs to be taken out of the cable management clip 30, the handle 3215 is pulled back to disengage the clasp 3211 from the hook 3153. The pressing clip 32 may be lifted upwards and the cable 50 can be removed.

When the cable management clip 30 needs to be detached from the securing board 10, each operating portion 3134 is operated, to deform the two elastic arms 313 in the first direction, until the two elastic arms 313 obtain clearance the two clipping portions 112. The cable management clip 30 is moved away from the securing portion 131, and the supporting rib 3151 is removed from the cutout 135. Therefore, the cable management clip 30 is detached from the securing board 10.

It is to be understood, however, that even though numerous characteristics and advantages of the exemplary embodiments have been set forth in the foregoing description, together with details of the structure and function of the exemplary embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cable management apparatus, comprising:
   a securing board; a clipping portion and a securing portion extending from the securing board; and
   a cable management clip comprising a mounting base and a pressing clip pivotally attached to the mounting base, an elastic arm extending from the mounting base;
   wherein the mounting base and the pressing clip are adapted to lock a cable between the mounting base and the pressing clip, the elastic arm is deformable in a first direction substantially parallel to the securing board and engaged with the clipping portion, and the mounting base is moveable in a second direction perpendicular to the first direction and engaged with the securing portion; and a cutout is defined in the securing portion, and a supporting rib is located on the mounting base and engaged in the cutout.

2. The cable management apparatus of claim 1, wherein a block is located on the elastic arm, and the block abuts the clipping portion.

3. The cable management apparatus of claim 2, wherein the block extends towards a third direction opposite to the second direction.

4. The cable management apparatus of claim 1, wherein a retaining portion is located on the mounting base and connected to the supporting rib, an engaging portion is located on the pressing clip, and the engaging portion is engaged with the retaining portion.

5. The cable management apparatus of claim 4, wherein the pressing clip comprises a connecting portion, a pressing portion, and a flexible pivoting portion located between the connecting portion and the pressing portion; and the connecting portion is connected to the base, and the pressing portion is adapted to rotate around the flexible pivoting portion.

6. The cable management apparatus of claim 5, wherein the engaging portion is located on the pressing portion.

7. The cable management apparatus of claim 4, wherein a hook extends from the retaining portion, the engaging portion comprises a clasp, and the clasp is clipped to the hook.

8. The cable management apparatus of claim 7, wherein the engaging portion further comprises an extending piece, and the extending piece abuts the retaining portion and separates the cable from the retaining portion.

9. The cable management apparatus of claim 1, wherein the elastic arm comprises an operating portion extending outside of the mounting base, and the operating portion is adapted to deform the elastic arm.

10. The cable management apparatus of claim 9, wherein the operating portion is L-shaped.

11. A cable management apparatus, comprising:
    a securing board; a clipping portion and a securing portion extending from the securing board; and
    a cable management clip, attached to the securing board, comprising a mounting base and a pressing clip pivotally attached to the mounting base; the mounting base and the pressing clip are adapted to lock a cable between the mounting base and the pressing clip, and the mounting base comprising a block and an elastic arm;
    wherein the clipping portion is engaged with the elastic arm, for preventing the cable management clip moving in a first direction substantially parallel to the securing board, the securing portion is engaged with the mounting base, for preventing the cable management clip moving in a second direction substantially perpendicular to the mounting base, and the block abuts the clipping portion, for preventing the cable management clip moving in a third direction opposite to the second direction; and the elastic arm is deformable to disengage the block from the clipping portion.

12. The cable management apparatus of claim 11, wherein the block is located on the elastic arm.

13. The cable management apparatus of claim 11, wherein the elastic arm comprises an operating portion extending outside of the mounting base, and the operating portion is adapted to deform the elastic arm.

14. The cable management apparatus of claim 13, wherein the operating portion is L-shaped.

15. The cable management apparatus of claim 11, wherein a cutout is defined in the securing portion, and a supporting rib is located on the mounting base and engaged in the cutout.

16. The cable management apparatus of claim 15, wherein a retaining portion is located on the mounting base and connected to the supporting rib, an engaging portion is located on the pressing clip, and the engaging portion is engaged with the retaining portion.

17. The cable management apparatus of claim 16, wherein the pressing clip comprises a connecting portion, a pressing portion, and a flexible pivoting portion located between the connecting portion and the pressing portion; the connection portion is connected to the base, and the pressing portion is adapted to rotate around the flexible pivoting portion.

18. The cable management apparatus of claim 17, wherein the engaging portion is located on the pressing portion.

19. The cable management apparatus of claim 16, wherein a hook extends from the retaining portion, the engaging portion comprises a clasp, and the clasp is clipped to the hook.

20. The cable management apparatus of claim 19, wherein the engaging portion further comprises an extending piece, and the extending piece abuts the retaining portion and separates the cable from the retaining portion.

* * * * *